(12) United States Patent
Matsumura et al.

(10) Patent No.: US 8,081,385 B2
(45) Date of Patent: Dec. 20, 2011

(54) ANTIGLARE FILM, METHOD FOR MANUFACTURING ANTIGLARE FILM, POLARIZER, AND DISPLAY DEVICE

(75) Inventors: Shinichi Matsumura, Miyagi (JP); Yumi Haga, Miyagi (JP); Tsutomu Nagahama, Miyagi (JP); Hitoshi Watanabe, Miyagi (JP)

(73) Assignee: Sony Corporation, Tokyo (JP)

( * ) Notice: Subject to any disclaimer, the term of this patent is extended or adjusted under 35 U.S.C. 154(b) by 527 days.

(21) Appl. No.: 12/171,118

(22) Filed: Jul. 10, 2008

(65) Prior Publication Data
US 2009/0015927 A1    Jan. 15, 2009

(30) Foreign Application Priority Data
Jul. 11, 2007   (JP) .................. 2007-182439

(51) Int. Cl.
*G02B 13/20* (2006.01)
*G02B 5/02* (2006.01)
(52) U.S. Cl. ....................... 359/599; 359/601
(58) Field of Classification Search ............. 359/599, 359/601–614
See application file for complete search history.

(56) References Cited

U.S. PATENT DOCUMENTS

| 7,031,061 | B2* | 4/2006 | Ito ................................. 359/599 |
| 7,567,383 | B2* | 7/2009 | Nagahama et al. ........... 359/599 |
| 2005/0255291 | A1 | 11/2005 | Iwata et al. |
| 2006/0153979 | A1 | 7/2006 | Asakura et al. |
| 2006/0215079 | A1* | 9/2006 | Suzuki et al. .................... 349/96 |
| 2007/0042173 | A1* | 2/2007 | Nagaoka et al. ........... 428/313.9 |
| 2008/0186582 | A1* | 8/2008 | Matsuura et al. ............. 359/601 |
| 2009/0002832 | A1* | 1/2009 | Tochigi et al. ................ 359/599 |
| 2010/0079701 | A1* | 4/2010 | Murayama et al. ............. 349/64 |

FOREIGN PATENT DOCUMENTS

| JP | 07-104108 | 4/1995 |
| JP | 2000-121809 | 4/2000 |
| JP | 2000206317 | 7/2000 |
| JP | 2000-265083 | 9/2000 |
| JP | 2004-347780 | 12/2004 |
| JP | 2005-199234 | 7/2005 |
| JP | 2005227407 | 8/2005 |
| JP | 2005316413 | 11/2005 |
| JP | 2006106224 | 4/2006 |
| JP | 2006116805 | 5/2006 |
| JP | 2006-145587 | 6/2006 |
| JP | 20060154838 | 6/2006 |
| JP | 2007-034027 | 2/2007 |
| JP | 2007041495 | 2/2007 |
| JP | 2007041533 | 2/2007 |
| JP | 2007-163971 | 6/2007 |
| JP | 2007-249191 | 9/2007 |
| WO | 2006106757 | 10/2006 |

\* cited by examiner

*Primary Examiner* — Thong Nguyen
(74) *Attorney, Agent, or Firm* — K&L Gates LLP (57) ABSTRACT

An antiglare film includes a base material and an antiglare layer which is disposed on at least one surface of the base material and which contains fine particles and a resin, wherein the fine particles constitute aggregates mainly in in-plane directions, and gradual unevenness is disposed on the surface of the antiglare layer through aggregation of the fine particles.

16 Claims, 7 Drawing Sheets

ANTIGLARE FILM, METHOD FOR MANUFACTURING ANTIGLARE FILM, POLARIZER, AND DISPLAY DEVICE

CROSS REFERENCE TO RELATED APPLICATIONS

The present application claims priority to Japanese Patent Application JP 2007-182439 filed in the Japanese Patent Office on Jul. 11, 2007, the entire contents of which are incorporated herein by reference.

BACKGROUND

The present application relates to an antiglare film, a method for manufacturing the antiglare film, a polarizer, and a display device. In particular, it relates to an antiglare film used for display surfaces of various display devices, e.g., a liquid crystal display (LCD), a plasma display panel (PDP), an electro luminescence (EL) display, a rear projection display, a rear projection display by using laser as a light source (laser TV), and a cathode ray tube (CRT) display.

Regarding various display devices, e.g., a liquid crystal display, a plasma display panel, and a CRT display, (1) a technology for reducing a reflectance by disposing an optical multilayer film or a low-refractive-index film on a display device surface and (2) a technology for diffuse-reflecting external light to blur a reflected image by disposing an antiglare film having a surface with fine unevenness have been previously adopted in order to prevent significant impairment of visibility due to reflection of external light, e.g., a fluorescent lamp, in surfaces.

The latter of the technologies described in the items (1) and (2) will be explained with reference to FIG. 7. An antiglare film 101 includes a base material 111 and an antiglare layer 112 disposed on the base material 111. The antiglare layer 112 contains fine particles 113, the fine particles protrude from the surface of the antiglare layer 112 and, thereby, a fine uneven shape is formed on the surface. The antiglare film 101 is formed by applying a paint containing fine particles 113, e.g., a silica filler and an organic filler, to a base material 111 and curing the paint. Regarding the antiglare film having the above-described configuration, the light incident on the antiglare layer 112 is diffused by the fine particles 113 protruded from the antiglare layer 112 and, thereby, the reflection due to surface reflection is reduced.

However, if the optical multilayer film is used, the production cost increases and, in addition, the antiglare property is not satisfactory. Even if the low-refractive-index film is used and the production cost is reduced, there is a problem in that the reflection is obtrusive because the reflectance is relatively high. On the other hand, regarding the technology for forming fine unevenness on a surface by mixing the silica filler or the organic filler and blurring a reflected image by diffuse reflection, since the shapes of protrusions formed by individual particles are steep, the antiglare property is obtained, but a feeling of white turbidity is intense. In particular, in the case where external light is intense, there is a problem in that the degree of contrast is reduced and the visibility is deteriorated.

Consequently, in recent years, a surface treatment in which the feeling of white turbidity is reduced (that is, the contrast is high) while the antiglare property is ensured has been desired. A few technologies therefor have been studied up to now.

For example, Japanese Unexamined Patent Application Publication No. 2005-316413 discloses an antiglare laminate produced by forming an uneven shape on the outermost surface of an antiglare layer in such a way that a plurality of aggregation portions having three-dimensional spatial structures formed from at least five fine particles are allowed to present in the antiglare layer and, in addition, the plurality of aggregation portions are prevented from gathering, in order to realize an excellent antiglare property, an improvement of contrast, an enhancement of transmission definition, a reduction in blurring of characters, and the like.

Japanese Unexamined Patent Application Publication No. 2006-54838 discloses an antiglare film which facilitates achievement of good resolution of displayed images of characters and the like and a state of clear contrast without a feeling of glare in the case where an image on a display surface is looked by controlling the haze, the glossiness, and the surface roughness.

Japanese Unexamined Patent Application Publication No. 2000-206317 discloses an antiglare film which allows the surface uneven shape to be minutely controlled at desired size and frequency of unevenness and has a periodical uneven shape, a polarizing film, a display device, and a method for manufacturing the antiglare film.

Figure 8:
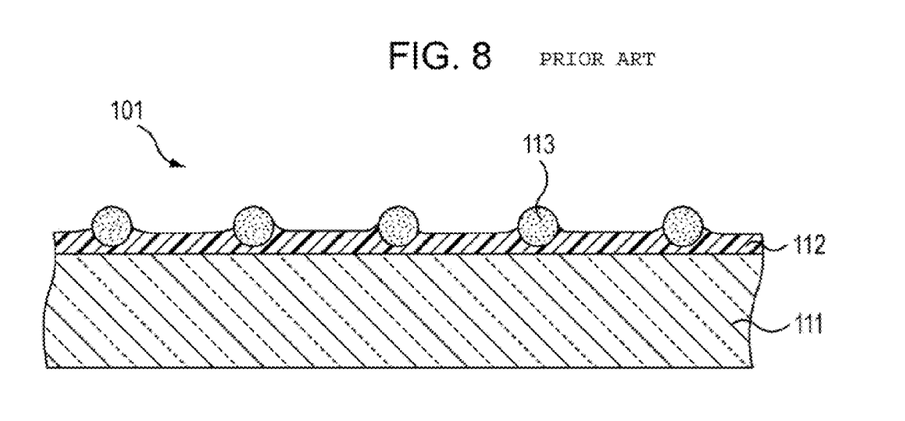
FIG. 8 is a schematic sectional view showing the configuration of an antiglare film in which the period of a fine uneven shape on the surface is allowed to increase.

For the purpose of improving the feeling of white turbidity of the antiglare film, as shown in FIG. 8, it is conceived that the content of fine particles 113 in the antiglare layer 112 is decreased so as to increase the period of the fine uneven structure of the surface.

However, the two characteristics of the antiglare property and the reduction in feeling of White turbidity are in the relationship of trade-off. Therefore, it is difficult to design an antiglare film having these characteristics, which are mutually compatible, on the basis of the related art.

For example, if the uneven shape is formed from aggregation portions having three-dimensional spatial structures as in Japanese Unexamined Patent Application Publication No. 2005-316413, steep protrusions are formed on the surface. As a result, surface scattering increases and the feeling of white turbidity is enhanced.

Furthermore, it is difficult to obtain satisfactory antiglare property and contrast merely by controlling the haze, the glossiness, and the surface roughness as in Japanese Unexamined Patent Application Publication No. 2006-154838.

Although an appropriate antiglare property can be obtained by disposing the periodic uneven shape as in Japanese Unexamined Patent Application Publication No. 2000-206317, it is difficult to obtain satisfactory contrast. Moreover, a moire may occur because of the periodic shape.

Figure 9:
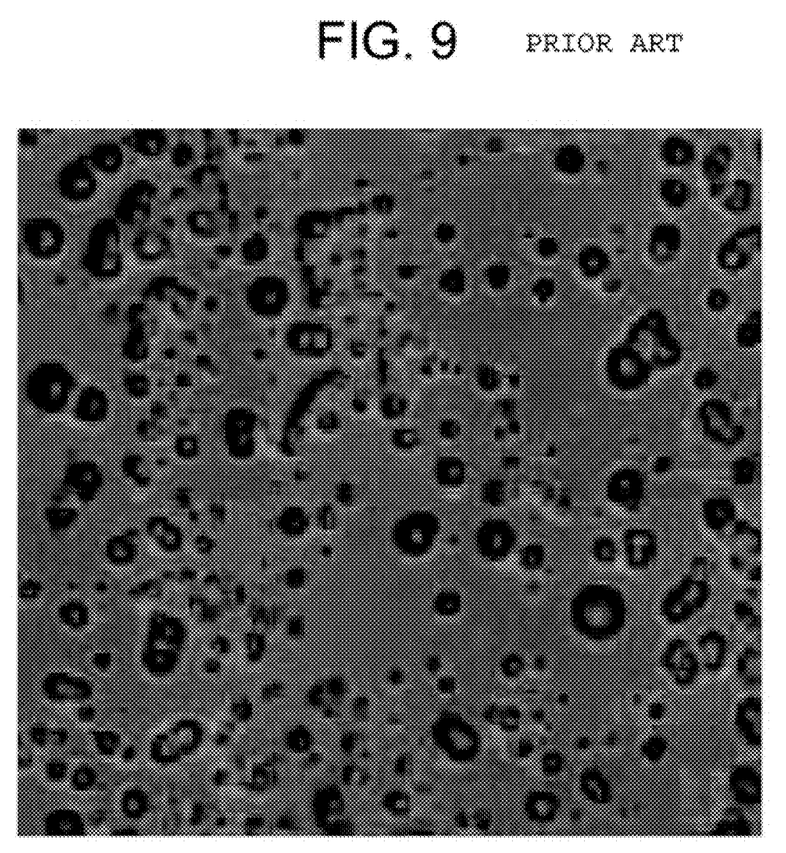
FIG. 9 is a surface photograph of the antiglare film in which the period of a fine uneven shape on the surface is allowed to increase.

If the antiglare property is restricted by increasing the period of the fine uneven structure of the surface as shown in FIG. 8, flat portions result between fine particles 113 protruded from the surface, as shown in FIG. 9, so that the antiglare property is reduced.

Accordingly, it is desirable to provide an antiglare film enable to the antiglare property and the reduction in feeling of white turbidity to become mutually compatible, a method for manufacturing the antiglare film, a polarizer, and a display device.

SUMMARY

The present inventors conducted intensive research. As a result, an antiglare film exhibiting excellent contrast while keeping the antiglare property was invented not by forming a steep uneven shape on the surface through protrusion of individual particles from the surface, but by forming a gentle, long-period, gradual unevenness through aggregation of fine particles mainly in in-plane directions.

An antiglare film according to an embodiment includes a base material and an antiglare layer which is disposed on at least one surface of the base material and which contains fine particles and a resin, wherein the fine particles constitute aggregates mainly in in-plane directions, and gradual unevenness is disposed on the surface of the antiglare layer through aggregation of the fine particles.

Since the gradual unevenness is disposed on the surface of the antiglare film according to an embodiment, the light can be scattered by the gradual unevenness.

A polarizer according to an embodiment includes the antiglare film. A display device according to an embodiment includes the antiglare film on a display surface.

A method for manufacturing an antiglare film according to an embodiment includes the steps of applying a paint containing a resin, fine particles, and a solvent to a base material, drying the paint to aggregate the fine particles mainly in in-plane directions and form gradual unevenness on the surface of the paint, and curing the paint provided with the gradual unevenness.

In the method for manufacturing an antiglare film according to an embodiment, since the fine particles are aggregated mainly in in-plane directions by drying the paint applied to the base material, the gradual unevenness can be formed on the surface.

As described above, according to an embodiment the uneven shape disposed on the surface is controlled and the diffuse reflection characteristics are controlled by using the gradual unevenness. Therefore, the contrast and the antiglare property, which are conflicting characteristics, can become mutually compatible. Consequently, an antiglare film exhibiting high contrast while keeping the antiglare property can be provided.

In an embodiment, the content of the fine particles in the antiglare layer is 3 percent by weight or more, and 15 percent by weight or less in terms of ratio relative to the resin.

Additional features and advantages are described herein, and will be apparent from the following Detailed Description and the figures.

DETAILED DESCRIPTION

Embodiments according will be described below with reference to the drawings. In all drawings of the following embodiments, the same or corresponding portions are indicated by the same reference numerals.

(1) First Embodiment (1-1) Configuration of Liquid Crystal Display Device

Figure 1:
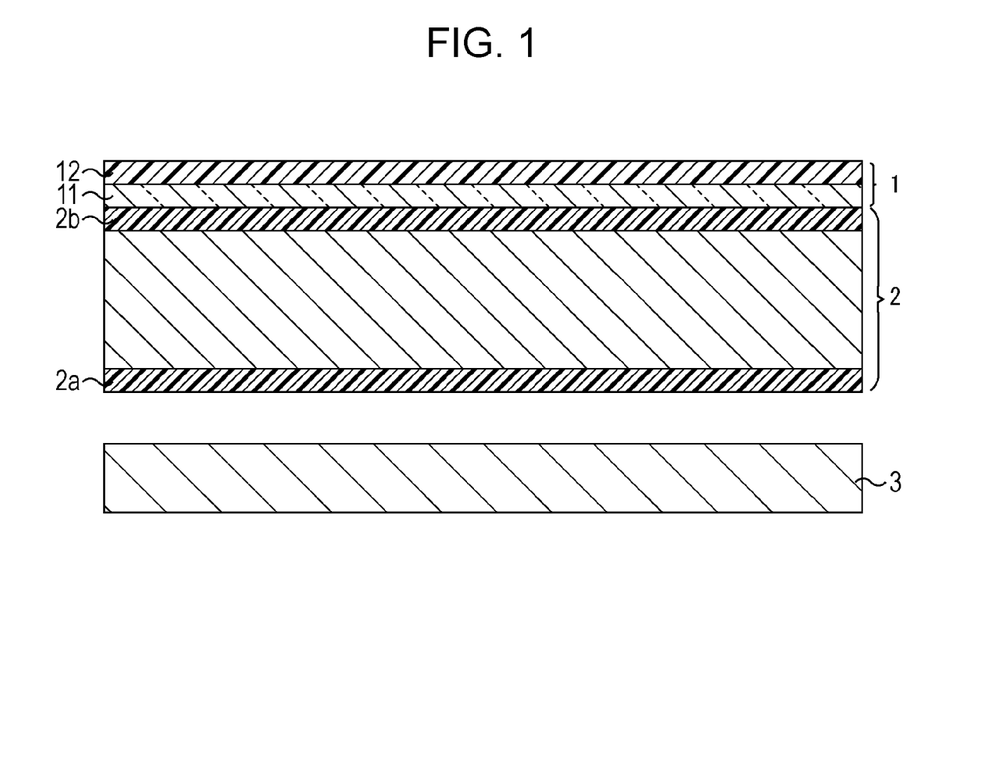
FIG. 1 is a schematic sectional view showing an example of the configuration of a liquid crystal display device according to a first embodiment.

FIG. 1 shows an example of the configuration of a liquid crystal display device according to the first embodiment. As shown in FIG. 1, this liquid crystal display device includes a backlight 3 for emitting light and a liquid crystal panel 2 for temporally spatially modulating the light emitted from the backlight 3 so as to display an image. The two surfaces of the liquid crystal panel 2 are provided with polarizers 2a and 2b, respectively. The polarizer 2b disposed on the display surface side of the liquid crystal panel 2 is provided with an antiglare film 1.

As for the backlight 3, for example, a direct-lighting type backlight, an edge type backlight, a plane light source type backlight can be used. The backlight 3 includes, for example, a light source, a reflection plate, and an optical film. As for the light source, for example, a cold cathode fluorescent lamp (CCFL), a hot cathode fluorescent lamp (HCFL), organic electroluminescence (OEL), and a light emitting diode (LED) can be used.

As for the liquid crystal panel 2, panels with display modes of a twisted nematic (TN) mode, a super twisted nematic (STN) mode, a vertically aligned (VA) mode, an in-plane switching (IPS) mode, an optically compensated birefringence (OCB) mode, a ferromagnetic liquid crystal (FLC) mode, a polymer dispersed liquid crystal (PDLC) mode, a phase change guest host (PCGH) mode, and the like can be used.

The two surfaces of the liquid crystal panel 2 are provided with, for example, polarizers 2a and 2b in such a way that the transmission axes thereof become orthogonal to each other. The polarizers 2a and 2b transmit only one of polarization components orthogonal to each other among the incident light, and intercept the other by absorption. As for the polarizers 2a and 2b, for example, hydrophilic polymer films, e.g., polyvinyl alcohol based films, partially formalized polyvinyl alcohol based films, and ethylene-vinyl acetate copolymer based partially saponified films, which have adsorbed dichroic substances, e.g., iodine or dichroic dyes, and have been uniaxially drawn can be used.

In particular, if the antiglare film according to an embodiment is combined with a backlight of partial drive system (the backlight is turned on and off partially and, thereby, black is further darkened), black can be further deepened and the contrast can be enhanced, so that a high-performance liquid crystal television and the like can be realized.

(1-2) Configuration of Antiglare Film

Figure 2:
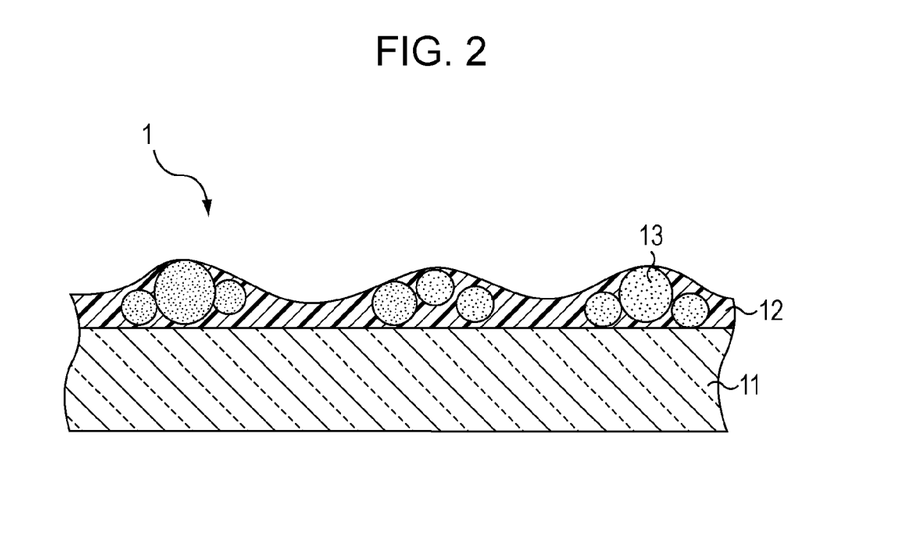
FIG. 2 is a schematic sectional view showing an example of the configuration of an antiglare film according to the first embodiment.

FIG. 2 shows an example of the configuration of the antiglare film 1 according to the first embodiment. As shown in FIG. 2, this antiglare film 1 includes the base material 11 and the antiglare layer 12 disposed on this base material 11 and has a gradually waved fine uneven shape on the surface. This antiglare film 1 is suitable for application to, for example, various displays, in particular liquid crystal display devices, of word processors, computers, televisions, car-mounted gauge board, and the like.

The surface haze is preferably 0% to 5%, and more preferably 0% to 1%. If the surface haze is 5% or less, there is almost no feeling of white turbidity, and if 1% or less, the feeling of white turbidity is further reduced, so that the contrast can be enhanced. The surface haze refers to a value based on detection of surface scattering, and the feeling of white turbidity increases as the surface haze becomes higher.

The total haze is preferably 3% to 40%, and more preferably 3% to 30%. If the total haze is controlled within the range of 3% to 40%, appropriate antiglare property can be obtained without deteriorating the mapping clarity. That is, if the total haze is less than 3%, it is difficult to obtain a satisfactory antiglare property. If the total haze exceeds 40%, the mapping clarity, is reduced. The total haze refers to a value of sum of the surface haze and the internal haze.

The white turbidity is preferably 0.5 to 2.0, more preferably 0.5 to 1.5. If the white turbidity is 2.0 or less, deterioration of contrast can be reduced, and if 1.5 or less, more excellent contrast can be realized. If the white turbidity is less than 0.5, the antiglare property deteriorates.

(Base Material)

As for the base material 11, transparent films, sheets, substrates, and the like can be used. As for the material for the base material 11, for example, polymer materials based on the related art can be used. Examples of polymer materials based on the related art include triacetyl celluloses (TAC), polyesters (TPEE), polyethylene terephthalates (PET), polyimides (PI), polyamides (PA), aramids, polyethylenes (PE), polyacrylates, polyether sulfones, polysulfones, polypropylenes (PP), diacetyl celluloses, polyvinyl chlorides, acrylic resins (PMMA), polycarbonates (PC), epoxy resins, urea resins, urethane resins, and melamine resins. Preferably, the thickness of the base material 11 is 38 to 100 μm from the viewpoint of the productivity, although not limited to this range.

Preferably, the base material 11 has a function as a protective film of the polarizer 2b. This is because it becomes unnecessary to dispose a protective film of the polarizer 2b separately and, therefore, the thickness of the polarizer 2b including the antiglare film 1 can be reduced.

(Antiglare Layer)

The antiglare layer 12 contains a resin and fine particles 13. The fine particles 13 are aggregated mainly in in-plane directions of the antiglare layer 12 so as to form two-dimensional aggregates. These aggregates are present on, for example, the surface of the antiglare layer without gathering. These aggregates constitute a continuous, gradually waved fine uneven shape on the surface of the antiglare layer 12. Here, the phrase "the fine particles 13 are aggregated mainly in in-plane directions of the antiglare layer 12" refers to (1) all fine particles 13 are aggregated merely in in-plane directions of the antiglare layer 12 without overlapping one another in the thickness direction or (2) almost all fine particles 13 are aggregated in in-plane directions and the other remaining fine particles 13 are overlapped one another in the thickness direction within the bounds of not causing an increase in white turbidity (not allowing the white turbidity to exceed 2.0).

The fine particles 13 on the surface of the antiglare layer are covered with a resin. Here, it is preferable that the fine particles 13 are completely covered with the resin from the viewpoint of reduction in the feeling of white turbidity. However, a part of the fine particles 13 may be exposed without being covered with the resin insofar as an increase in white turbidity is not invited (the white turbidity does not exceed 2.0). It is ideal that all the fine particles 13 form two-dimensional aggregates. However, a part of the fine particles 13 may be isolated without forming an aggregate within the bounds of not causing an increase in white turbidity.

The average film thickness of the antiglare layer 12 is preferably 3 to 20 μm, and more preferably 4 to 15 μm. If this range is employed, satisfactory antiglare property and hardness can be obtained. If the thickness exceeds 20 μm, curling occurs significantly, and the operability in the following step may be hindered. Preferably, the arithmetic average roughness Ra of the roughness curve of the surface of the antiglare layer 12 is 0.05 to 0.5 μm. If the arithmetic average roughness Ra of the roughness curve is less than 0.05 μm, the antiglare property deteriorates. If Ra exceeds 0.5 μm, the contrast is reduced.

The fine particles 13 serving as a filler are, for example, spherical fine particles of inorganic fine particles or organic fine particles. Preferably, the average particle diameter of the fine particles 13 is 0.01 to 10 μm. If the average particle diameter is 0.01 to 10 μm, in control of the film thickness after application and before drying, appropriate convection and Benard cells can be formed. That is, if the average particle diameter is less than 0.01 μm, the film thickness before the drying is small and, therefore, it becomes hard to form Benard cells. If the average particle diameter exceeds 10 μm, the film thickness before the drying becomes large, Benard cells become large, the fine particles 13 form aggregates having three-dimensional spatial structures, and protrusions formed from the aggregates become steep, so that the feeling of white turbidity is enhanced. As for the fine particles 13, it is preferable to use fine particles having surface energy larger than the surface tension of the solvent contained in the paint used in the production of the antiglare layer 12.

As for the organic fine particles, fine particles formed from acrylic resins (PMMA), polystyrenes (PS), acryl-styrene copolymers, melamine resins, polycarbonates (PC), and the like can be used. The organic fine particles are not specifically limited by reactions. For example, the reaction may involve cross-linking or may not involve cross-linking. Any fine particles formed from plastic and the like can be used.

As for the inorganic fine particles, fine particles formed from silicon oxide, titanium oxide, aluminum oxide, zinc oxide, tin oxide, calcium carbonate, barium sulfate, talc, kaolin, calcium sulfate, and the like can be used. It is preferable that an organic substance treatment is applied to the inorganic fine particles to make the surfaces thereof nonpolar. This is because convection and aggregation of the fine particles 13 occur appropriately during the drying step described later and, thereby, predetermined Benard cells are easily formed.

Figure 7:
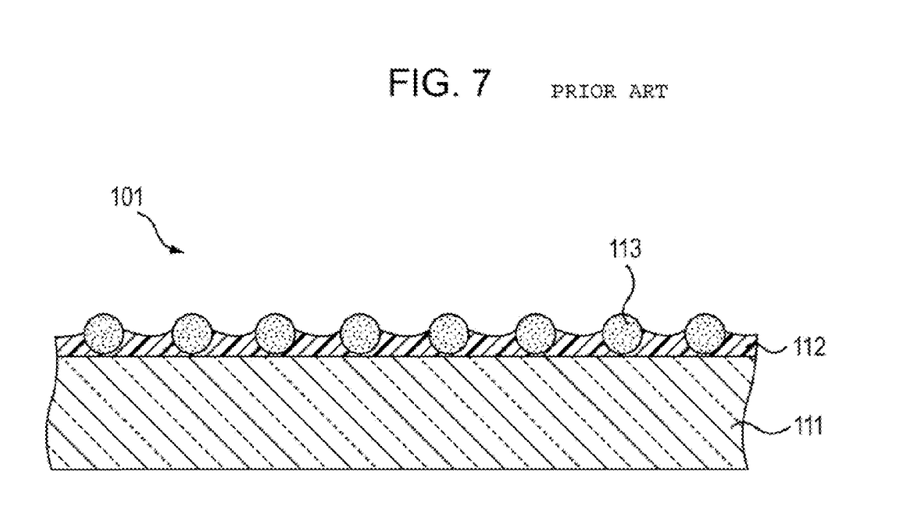
FIG. 7 is a schematic sectional view showing the configuration of an antiglare film according to a related art.

The antiglare film 1 according to the first embodiment has a continuous, gradual fine uneven shape, as shown in FIG. 2, whereas the antiglare film according to the related art has a fine uneven shape including steep angle components, as shown in FIG. 7. Therefore, regarding the antiglare film 1 according to the first embodiment, diffusion of the light over a wide angle is reduced and an occurrence of white turbidity in the display screen can be reduced, whereas regarding the antiglare film according to the related art, the light diffuses over a wide angle and white turbidity occurs in the display screen. In the antiglare film according to the related art, as shown in FIG. 7, the fine uneven shape is determined on the basis of the particle size and the amount of protrusion of fine particles.

(1-3) Method for Manufacturing Antiglare Film

An example of a method for manufacturing the antiglare film 1 having the above-described configuration will be described below. This method for manufacturing the antiglare film includes a paint preparation step of preparing a paint, an application step of applying the paint to the base material, a drying step of drying the applied resin, and a curing step of curing the dried resin.

(Preparation of Paint)

The resin and the fine particles 13 are added to the solvent and mixing is conducted so as to obtain the paint in which the fine particles 13 are dispersed. At this time, if necessary, a light stabilizer, an ultraviolet absorber, an antistatic agent, a flame retardant, an antioxidant, and the like may be further added. Moreover, silica fine particles or the like may be further added as a viscosity modifier.

As for the resin, an ionizing radiation curable resin which is cured by light, electron beams, or the like or a thermosetting resin which is cured by heat can be used alone or in combination. From the viewpoint of ease of production, the photosensitive resin which is cured by ultraviolet rays is most preferable. Examples of resins usable as such photosensitive resins include acrylate resins, e.g., urethane acrylates, epoxy acrylates, polyester acrylates, polyol acrylates, polyether acrylates, and melamine acrylates. For example, the urethane acrylate resin can be obtained by reacting a polyester polyol with an isocyanate monomer or a prepolymer and reacting the resulting product with an acrylate or methacrylate monomer having hydroxyl groups. The characteristics after curing can be selected appropriately. For example, a resin having an excellent light transmission property is preferable from the viewpoint of the image transmission property, and a resin having a high hardness is preferable from the viewpoint of the scratching resistance. The photosensitive resin is not specifically limited to the ultraviolet curable resin, and any resin having a light transmission property can be used. However, a resin which does not exhibit change in hue of the transmitted light and the amount of transmission of light resulting from coloring and haze is preferable.

In the case where a photosensitive resin is used as the ionizing radiation curable resin, benzophenone derivatives, acetophenone derivatives, anthraquinone derivatives, and the like can be used alone or in combination as a photopolymerization initiator contained in the photosensitive resin. Furthermore, this photosensitive resin may contain appropriately selected component, e.g., an acrylic resin, for facilitating coating film formation.

As for the thermosetting resin, for example, phenol resins, urea resins, diallylphthalate resins, melamine resins, guanamine resins, unsaturated polyester resins, polyurethane resins, epoxy resins, aminoalkyd resins, melamine-urea co-condensation resins, silicone resins, polysiloxane resins, and cellulose propionate acetates can be used. If necessary, additives, e.g., cross-linking agents, curing agents, such as polymerization initiators, and viscosity modifiers, nay be added.

Preferably, the solvent has a surface tension smaller than the surface energy of the fine particles 13. This is because the fine particles 13 can be aggregated mainly in in-plane directions by using such a solvent. Examples of solvents can include ketones, e.g., acetone, diethyl ketone, dipropyl ketone, methyl ethyl ketone, methyl butyl ketone, methyl isobutyl ketone, cyclohexanone, methyl formate, ethyl formate, propyl formate, isopropyl formate, butyl formate, methyl acetate, ethyl acetate, propyl acetate, isopropyl acetate, butyl acetate, isobutyl acetate, sec-butyl acetate, amyl acetate, isoamyl acetate, sec-amyl acetate, methyl propionate, ethyl propionate, methyl butyrate, ethyl butyrate, and methyl lactate, solvents composed of carboxylic acid esters, and alcohols, e.g., methanol, ethanol, isopropanol, n-butanol, sec-butanol, and tert-butanol. These solvents may be used alone or a mixture of at least two components may be used. Furthermore, solvents other than those described above may also be added within the bounds of not impairing the performance of the resin composition.

Preferably, a solvent having a surface tension of 23 mN/m or less at an application temperature is used. This is because Benard cells are formed appropriately and gradual waves can be obtained on the antiglare layer surface in a drying step which is a downstream step. If the surface tension exceeds the above-described range, aggregation of the fine particles 13 occurs significantly, and the unevenness formed on the surface of the antiglare layer 12 tends to become large. Therefore, an excellent antiglare property is exhibit, but white turbidity may occur so that the surface may glare. Examples of suitable organic solvents include tert-butanol having a surface tension of 20.0 mN/m at an environmental temperature of 20° C. and isopropyl acetate having a surface tension of 22.1 mN/m at an environmental temperature of 22° C., although not limited to these materials insofar as the above-described requirements are satisfied.

The surface tension of the solvent can be calculated on the basis of a wilhelmy method, wherein a wilhelmy plate is allowed to contact a liquid sample so that a strain is applied and a force pulling the wilhelmy plate into the liquid is measured. As for the measuring apparatus, for example a dynamic surface tension measuring apparatus (trade name: Rheosurf, produced by UBM Co., Ltd.) can be used.

(Application)

The paint obtained as described above is applied to the base material 11. The paint is applied in such a way that the average film thickness after drying becomes preferably 3 to 20 µm, and more preferably 4 to 15 µm. In the case where the value of the film thickness is smaller than this range, it becomes difficult to obtain a desired hardness. In the case where the value is larger than this range, curling may occur significantly. The thickness of the application can be selected by appropriately adjusting, for example, the solid content of the paint. The application method is not specifically limited and application methods based on the related art can be used. Examples of application methods based on the related art can include a microgravure coating method, a wire bar coating method, a direct gravure coating method, a die coating method, a dipping method, a spray coating method, a reverse roll coating method, a curtain coating method, a comma coating method, a knife coating method, and a spin coating method.

(Drying)

The paint applied to the base material 11 is dried and, thereby, the solvent is volatilized. A fine uneven shape is formed on the coating film surface through convection generated during drying of the solvent and aggregation of the fine particles 13 generated during formation of Benard cells. At this time, the fine particles 13 are aggregated mainly in in-plane directions of the antiglare layer 12. This is because if the fine particles 13 are overlapped one another in the thickness direction of the coating film, steep angle components are formed as the surface shape and, thereby, the feeling of white turbidity is enhanced.

The degree of aggregation of the fine particles 13 can be selected by appropriately adjusting, for example, the surface tension of the solvent and the surface energy of the fine particles. Furthermore, the drying temperature and the drying time can be appropriately determined on the basis of the boiling point of the solvent contained in the paint. In that case, preferably, the drying temperature and the drying time are selected within the bounds of not causing the deformation of the base material 11 through heat shrinkage in consideration of the heat resistance of the base material 11.

It is preferable that a gradually waved fine uneven shape is formed on the coating film surface by using meniscus of the liquid resin formed in Benard cells. In order to maintain the meniscus formed in the Benard cell after the drying, it is preferable that the resin remains in a liquid state after the drying step until the resin is cured. This is because a gradual wave on the surface can be maintained even after the drying.

The drying condition is not specifically limited. Air drying may be employed or artificial drying in which the drying temperature, the drying time, and the like are adjusted may be employed. However, in the case where air is blown on the paint surface during the drying, it is preferable that a wind ripple is not generated on the coating film surface. If the wind ripple is generated, a desired gradually waved fine uneven shape tends to become difficult to form on the antiglare layer surface, and it becomes difficult to make the antiglare property and the contrast mutually compatible.

(Curing)

Subsequently, the resin dried on the base material 11 is cured by ionizing irradiation or heating. In this manner, a fine uneven shape having a large period can be formed in such a way that a two-dimensional aggregate constitute one crest. That is, the gradual fine uneven shape having a large period as compared with that of the related art is formed on the surface of the antiglare layer 12. As described above, this fine uneven shape is formed through convection generated during drying of the solvent and aggregation of the fine particles generated during formation of Benard cells.

As for the ionizing radiation, for example, electron beams, ultraviolet rays, visible light, gamma rays, and the like can be used. The ultraviolet rays are preferable from the viewpoint of the production facilities. As for the ultraviolet ray sources, extra-high pressure mercury lamps, high pressure mercury lamps, low pressure mercury lamps, carbon arcs, xenon arcs, metal halide lamps, and the like can be used. Preferably, the cumulative amount of radiation is appropriately selected in consideration of the curing characteristic of the resin, reduction in yellowing of the resin and the base material 11, and the like. The atmosphere of the irradiation can be appropriately selected in accordance with the manner of the resin curing. Examples thereof include atmospheres of air and inert gases, e.g., nitrogen and argon.

In this manner, a desired antiglare film 1 is obtained.

As described above, according to the first embodiment, since the fine particles 13 are aggregated mainly in in-plane directions, the gradual unevenness (adjusted angle components) can be formed on the surface of the antiglare layer. Therefore, the white turbidity can be reduced and, in addition, an appropriate antiglare property can be provided. That is, both the antiglare property and the contrast can be made favorable. Furthermore, the feeling of graininess can also be reduced. Therefore, the visibility of image can be improved by providing such an antiglare film to a display device.

(2) Second Embodiment (2-1) Configuration of Antiglare Film

Figure 3:
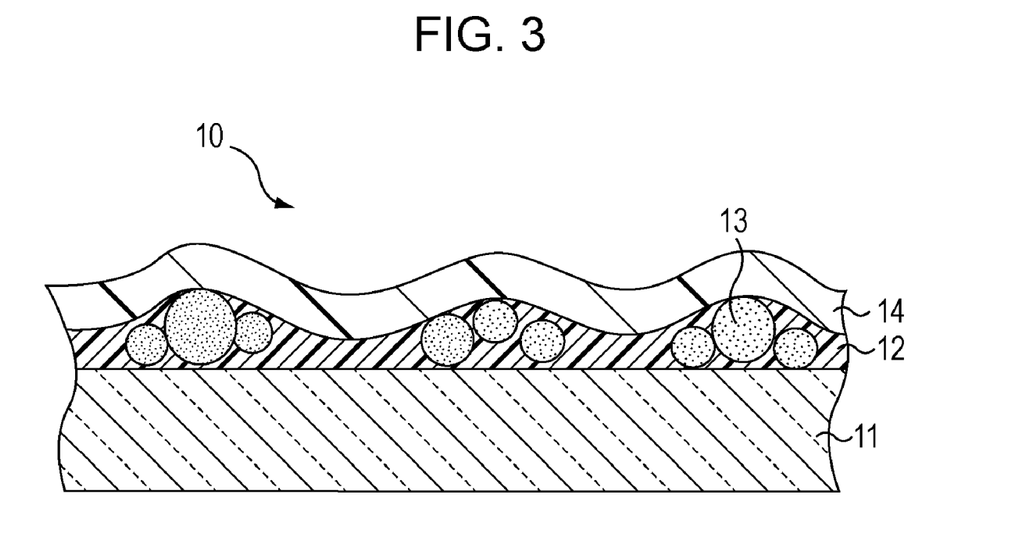
FIG. 3 is a schematic sectional view showing an example of the configuration of an antiglare film according to a second embodiment.

FIG. 3 shows an example of the configuration of an antiglare film according to the second embodiment. The same portions as those in the above-described first embodiment are indicated by the same reference numerals and the explanations thereof will not be provided. This antiglare film 10 corresponds to the antiglare film 1 in the above-described first embodiment in which a low-refractive-index layer 14 having a refractive index lower than the antiglare layer 12 is disposed on the antiglare layer 12. A fine uneven shape is disposed on the surface of the low-refractive-index layer 14. This fine uneven shape has waves more gradual than or equal to, for example, those of the fine uneven shape on the antiglare layer surface.

The refractive index of the low-refractive-index layer 14 can be reduced by, for example, adding hollow fine particles to a matrix formed from an ionizing radiation curable resin. Examples of the above-described hollow fine particles include inorganic fine particles, e.g., silica and alumina, and organic fine particles, e.g., styrene and acryl. However, silica fine particles are particularly preferable. This hollow fine particle includes air in the inside and, therefore, the refractive index of the hollow fine particle is lower than that of a common particle. For example, the refractive index of silica fine particle is 1.46, whereas the refractive index of the hollow silica fine particle is 1.45 or less. Furthermore, in the case where the hollow fine particles are added to the matrix, since this fine particle is hollow, the matrix does not soak into the inside of the fine particle. Consequently, an increase in refractive index can be prevented.

As for the low-refractive-index layer 14, for example, a low-refractive-index layer containing hollow fine particles and a low-refractive-index layer containing a fluorine based resin can be used. However, preferably, the low-refractive-index layer containing hollow fine particles is used. The reasons therefor are as described below.

(1) The resin is acryl and UV curing is conducted. Therefore, the alkali resistance is improved. (2) In the case where an acrylic resin is used as a matrix (resin) constituting the low-refractive-index layer 14, the affinity between the matrix and the antiglare layer 12 serving as a substrate is good. Therefore, the matrix is leveled and easily follows the unevenness of the surface of the antiglare layer serving as the substrate. Consequently, the antiglare property is not impaired even in the case where the low-refractive-index layer 14 is disposed on the surface of the antiglare layer 12. (3) The resin containing the hollow fine particles exhibits the wettability with the antiglare layer 12 serving as a substrate better than that of the fluorine (F) based resin. (4) The low-refractive-index layer 14 containing the hollow fine particles exhibit improved adhesion to the antiglare layer 12 as compared with the low-refractive-index layer 14 containing the fluorine based resin. (5) The refractive index of the low-refractive-index layer 14 containing the hollow fine particles can be reduced as compared with that of the low-refractive-index layer 14 containing the fluorine based resin. (6) In the case where the ultraviolet curable resin is used as the matrix, the surface hardness is not reduced. (7) The cost of the low-refractive-index layer 14 containing the hollow fine particles is lower than the cost of the low-refractive-index layer 14 containing the fluorine based resin. (8) The scratch resistance of the low-refractive-index layer 14 containing the hollow fine particles can be improved as compared with that of the low-refractive-index layer 14 containing the fluorine based resin. (9) The low-refractive-index layer 14 containing the hollow fine particles is friendly to the environment as compared with the low-refractive-index layer 14 containing the fluorine based resin.

Preferably, the average particle diameter of the hollow fine particles is 10 to 200 nm, and more preferably 30 to 60 nm. If the average particle diameter exceeds 200 nm, the size becomes not negligible relative to the wavelength of the visible light. Therefore, the light is scattered on the surface of the low-refractive-index layer 14, the surface seems to be whitish, and the transparency thereof is reduced. If this average particle diameter is less than 10 nm, the hollow fine particles tend to aggregate. Furthermore, preferably, the hollow fine particles, e.g., hollow silica fine particles, have (meth)acryloyl groups, which polymerize by ionizing radiation, on the surfaces thereof from the viewpoint of an improvement of affinity with the resin.

The low-refractive-index layer 14 is, for example, a layer produced by curing an ionizing radiation curable resin. Preferably, the resin contains 90% or more of polyfunctional monomer. Examples of polyfunctional monomers include esters of polyhydric alcohols and (meth)acrylic acids (for example, ethylene glycol di(meth)acrylate, 1,4-dicyclohexane diacrylate, pentaerithritol tetra(meth)acrylate, pentaerithritol tri(meth)acrylate, trymethylolpropane tri(meth)acrylate, trymethylolethane tri(meth)acrylate, dipentaerithritol tetra(meth)acrylate, dipentaerithritol penta(meth)acrylate, dipentaerithritol hexa(meth)acrylate, 1,2,3-cyclohexane tetramethacrylate, polyurethane polyacrylate, and polyester polyacrylate).

The additive may contain modified silicon acrylate compounds and the like. Specific examples thereof include compounds having at least one organic group in the methylsilicon molecule. Preferably, the equivalent of organic group bonded to methylsilicon is 1,630 g/mol or more. As for the method for measuring the equivalent of organic group, a method in which a nuclear magnetic resonance (NMR) measuring method is used and calculation is conducted on the basis of a peak intensity ratio of $^1H$ of methyl group to $^1H$ of organic group in the methylsilicon molecule can be used. Examples of organic groups include a methacrylic group, an acrylic group, and a mercapto group.

(2-2) Method for Manufacturing Antiglare Film

An example of a method for manufacturing an antiglare film according to the second embodiment will be described below. This method for manufacturing the antiglare film according to the second embodiment corresponds to the method in the above-described first embodiment in which a step of forming a low-refractive-index layer is further included after the step of forming the antiglare layer.

The step of forming a low-refractive-index layer will be specifically described below.

(Preparation of Paint)

For example, a paint is produced by mixing the resin and the solvent. At this time, if necessary, a light stabilizer, an ultraviolet absorber, an antistatic agent, a flame retardant, an antioxidant, and the like may be further added.

As for the resin, an ionizing radiation curable resin which is cured by light, electron beams, or the like or a thermosetting resin which is cured by heat can be used alone or in combination. From the viewpoint of ease of production, the photosensitive resin which is cured by ultraviolet rays is most preferable. The resins as in the above-described first embodiment can be used as the ionizing radiation curable resin and the thermosetting resin.

Preferably, a resin containing, for example, a thermosetting resin which is cured by the heating during the driving step is used. This is because flattening of the antiglare layer surface because of the paint flowing into a concave portion of the antiglare layer surface and filling the concave portion can be restricted by using such a resin. Furthermore, from the viewpoint of water repellency and oil repellency, preferably, a resin containing fluorine (F) is used.

Preferably, a solvent which dissolves a resin material to be used and which does not dissolve the antiglare layer 12 serving as a substrate is used. Examples of such solvents include organic solvents, e.g., tert-butanol, toluene, methyl ethyl ketone (MEK), isopropyl alcohol (IPA), and methyl isobutyl ketone (MIBK).

(Application)

The paint obtained as described above is applied to the antiglare layer 12. The application method is not specifically limited, and the same application method based on the related art as that in the step of preparing the antiglare layer can be used. A predetermined thickness of paint is uniformly applied to the antiglare layer 12 and, thereby, a fine uneven shape having waves more gradual than or equal to those of the fine uneven shape on the antiglare layer surface can be formed on the surface of the coating film.

(Drying and Curing)

The paint applied to the antiglare layer 12 is dried and cured. Consequently, the low-refractive-index layer 14 having a gradual fine uneven shape on the surface is formed. The same drying and curing methods as those in the step of preparing the antiglare layer can be used.

In this manner, a desired antiglare film 10 is obtained.

According to the second embodiment, since the low-refractive-index layer 14 is disposed on the antiglare layer 12, the refractive index can be further reduced as compared with that in the above-described first embodiment and, in addition, the antifouling property can be provided to the surface of the antiglare layer 12.

EXAMPLES

The present application will be described below with reference to examples according to an embodiment. However, the present application is not limited to these examples.

In the following examples and comparative examples, the dry film thickness and the average particle diameter of the antiglare layer were determined as described below.

(Dry Film Thickness of Antiglare Layer)

The thickness of the antiglare layer was measured by using a thickness meter (electric micrometer, produced by TESA K.K.).

(Average Particle Diameter)

The particle diameter was measured with Coulter Multisizer. The average value of the obtained data was taken as an average particle diameter of the fine particles (beads).

Example 1

Raw materials shown in the following paint composition were mixed, and agitation was conducted with a magnetic stirrer for 1 hour, so as to obtain a paint. The resulting paint was applied to a TAC film (produced by Fuji Photo Film Co., Ltd.) having a thickness of 80 µm with a bar coater. After drying was conducted for 2 minutes in a drying furnace at 80° C., ultraviolet rays were applied at 500 mJ/cm$^2$, so as to form an antiglare layer having a thickness of 11 µm. In this manner, a desired antiglare film was obtained.

Paint Composition

Resin: tetrafunctional urethane acrylic oligomer 100 parts by weight

Initiator: Irgacure 184 5 parts by weight

Solvent: t-butanol 120 parts by weight

Fine particles: cross-linkable styrene beads SBX6 (produced by SEKISUI PLASTICS CO., Ltd.), average particle diameter 6 µm 6 parts by weight Example 2

Raw materials shown in the following paint composition were mixed, and agitation was conducted with a magnetic stirrer for 1 hour, so as to obtain a paint. An antiglare film including an antiglare layer having a dry film thickness of 12 µm was obtained as in Example 1 except that the resulting paint was used.

Paint Composition

Resin: tetrafunctional urethane acrylic oligomer 100 parts by weight

Initiator: Irgacure 184 5 parts by weight

Solvent: t-butanol 120 parts by weight

Fine particles: cross-linkable styrene beads SBX6 (produced by SEKISUI PLASTICS CO., Ltd.) average particle diameter 6 µm 7 parts by weight Example 3

Raw materials shown in the following paint composition were mixed, and agitation was conducted with a magnetic stirrer for 1 hour, so as to obtain a paint. An antiglare film including an antiglare layer having a dry film thickness of 12 μm was obtained as in Example 1 except that the resulting paint was used.

Paint Composition

Resin: tetrafunctional urethane acrylic oligomer 100 parts by weight

Initiator: Irgacure 184 5 parts by weight

Solvent: t-butanol 120 parts by weight

Fine particles: cross-linkable styrene beads SBX6 (produced by SEKISUI PLASTICS CO., Ltd.), average particle diameter 6 μm 15 parts by weight Example 4

Raw materials shown in the following paint composition were mixed, and agitation was conducted with a magnetic stirrer for 1 hour, so as to obtain a paint. An antiglare film including an antiglare layer having a dry film thickness of 9.5 μm was obtained as in Example 1 except that the resulting paint was used.

Paint Composition

Resin: tetrafunctional urethane acrylic oligomer 100 parts by weight

Initiator: Irgacure 184 5 parts by weight

Solvent: t-butanol 120 parts by weight

Fine particles: cross-linkable styrene beads SBX6 (produced by SEKISUI PLASTICS CO., Ltd.), average particle diameter 6 μm 3 parts by weight Example 5

An antiglare film was obtained as in Example 1. A macromolecular polymer containing fluorine (F) having a thickness of 120 nm was applied to the resulting antiglare film by a dipping method and, thereafter, curing was conducted. Consequently, a low-refractive-index layer (antireflective coating) was formed on the antiglare layer. In this manner, a desired antiglare film was obtained.

Example 6

Raw materials shown in the following paint composition were mixed, and agitation was conducted with a magnetic stirrer for 1 hour, so as to obtain a paint. An antiglare film including an antiglare layer having a dry film thickness of 20 μm was obtained as in Example 1 except that the resulting paint was used.

Paint Composition

Resin: tetrafunctional urethane acrylic oligomer 100 parts by weight

Initiator: Irgacure 184 5 parts by weight

Solvent: toluene 120 parts by weight

Fine particles: acryl styrene copolymer filler (MS filler) (produced by SEKISUI PLASTICS CO., Ltd.), average particle diameter 10 μm 5 parts by weight Example 7

Raw materials shown in the following paint composition were mixed, and agitation was conducted with a magnetic stirrer for 1 hour, so as to obtain a paint. An antiglare film including an antiglare layer having a dry film thickness of 3 μm was obtained as in Example 1 except that the resulting paint was used.

Paint Composition

Resin: tetrafunctional urethane acrylic oligomer 100 parts by weight

Initiator: Irgacure 184 5 parts by weight

Solvent: butyl acetate 20 parts by weight methyl isobutyl ketone (MIBK) 100 parts by weight Fine particles: silica filler (produced by SEKISUI PLASTICS CO., Ltd.), average particle diameter 0.01 μm 3 parts by weight Example 8

An antiglare film was obtained as in Example 1. A low-refractive-index coating solution composed of the following composition was applied on the resulting antiglare film by a die coating method in such a way that the dry film thickness became 100 nm, and drying was conducted at 80° C. for 1 minute and 30 seconds. Thereafter, a low-refractive-index layer was formed by curing in a nitrogen atmosphere (oxygen concentration 1,000 ppm). In this manner, the low-refractive-index layer (antireflective coating) was formed on the antiglare layer, and a desired antiglare film was obtained.

Paint Composition

Resin: polyester aclylate oligomer 8 parts by weight trimethylolpropanetriacrylate 35 parts by weight 1,6-hexanediol diacrylate 57 parts by weight Initiator: Irgacure 127 19 parts by weight Modified silicon acrylate compound 2.5 parts by weight Hollow silica sol (average particle diameter 60 nm) 120 parts by weight Solvent: IPA 500 parts by weight n-butanol 7,400 parts by weight Comparative Example 1

An antiglare film including an antiglare layer having a dry film thickness of 12 μm was obtained as in Example 1 except that toluene having surface energy larger than that of the filler was used as the solvent and the amount of addition of fine particles was specified to be 10 parts by weight.

Comparative Example 2

An antiglare film including an antiglare layer having a dry film thickness of 12 μm was obtained as in Example 3 except that the amount of addition of filler was changed to 20 parts by weight.

Comparative Example 3

An antiglare film including an antiglare layer having a dry film thickness of 17 μm was obtained as in Example 6 except that acryl styrene copolymer filler (produced by SEKISUI PLASTICS CO., Ltd.) having an average particle diameter of 12 μm was used.

(Antiglare Property)

Regarding the antiglare films of Examples 1 to 8 and Comparative examples 1 to 3, the antiglare property was evaluated. Specifically, bare fluorescent lamps were reflected in the antiglare film, and the manner of blurring of the reflected image was evaluated on the basis of the criteria described below. The results thereof are shown in Table 2.

A: contours of fluorescent lamps are not identified (two fluorescent lamps look like one fluorescent lamp)

B: fluorescent lamps can be recognized to some extent, but contours are obscure

C: fluorescent lamps are reflected as they are (White Turbidity)

Regarding the antiglare films of Examples 1 to 8 and Comparative examples 1 to 3, the white turbidity was measured. The results thereof are shown in Table 2. The feeling of white turbidity is sensed on the basis of detection of the reflected light diffused at the antiglare layer surface. Here, a commercially available spectrophotometer was used. The above-described phenomenon was reproduced by simulation, and a quantified value was taken as the white turbidity. It was ascertained by experiments that there was a correspondence between the white turbidity based on the present measurement and the feeling of white turbidity sensed visually.

A specific method for measuring the white turbidity will be described below. In order to reduce the effect of back-side reflection and evaluate diffuse reflection of the antiglare film itself, back sides of the antiglare films of Examples 1 to 8 and Comparative examples 1 to 3 were bonded to black glass with an adhesive therebetween. A sphere spectrophotometer (trade name: SP64, produced by X-Rite, Incorporated) was used, diffusion light was applied to the sample surface, and a measurement was conducted with a d/8° optical system in which reflected light was measured with a detector located at a position in a direction inclined 8° from the direction normal to the sample. The measurement was conducted at a detection viewing angle of 2° by adopting an SPEX mode in which a specular reflection component was excluded and only diffuse reflection components were detected.

(Evaluation of Roughness)

Regarding the antiglare films of Examples 1 to 8 and Comparative examples 1 to 3, the surface roughness was measured, a roughness curve was obtained from a two-dimensional, cross-sectional curve, and an arithmetic average roughness Ra was calculated as a roughness parameter. The results thereof are shown in Table 2. The measurement condition was based on JIS B0601: 2001. The measurement apparatus and the measurement condition were as described below.

Measurement apparatus: fully automatic microfigure measuring instrument (trade name: SURFCORDER FT4000A, produced b) Kosaka Laboratory Ltd.)

Measurement condition: cut off value ($\lambda c$) 0.8 mm, evaluation length 4 mm (cut off value×5 times)
data sampling interval 0.5 μm (Haze Measurement)

Regarding the antiglare films of Examples 1 to 8 and Comparative examples 1 to 3, the surface haze and the internal haze were measured. The results thereof are shown in Table 2. The total haze refers to a value of sum of the surface haze and the internal haze.

Evaluation apparatus: haze meter (trade name: Model HM-150, produced by MURAKAMI COLOR RESEARCH LABORATORY)

Evaluation condition: JIS K7136

(Surface Observation)

Regarding the antiglare films of Examples 1 to 8 and Comparative examples 1 to 3, the surfaces were observed with a laser microscope and an optical microscope. The results thereof are shown in Table 2.

In Table 2, "two-dimensional aggregation", "three-dimensional aggregation", and "all over surface" indicate the following contents.

Figure 4A:
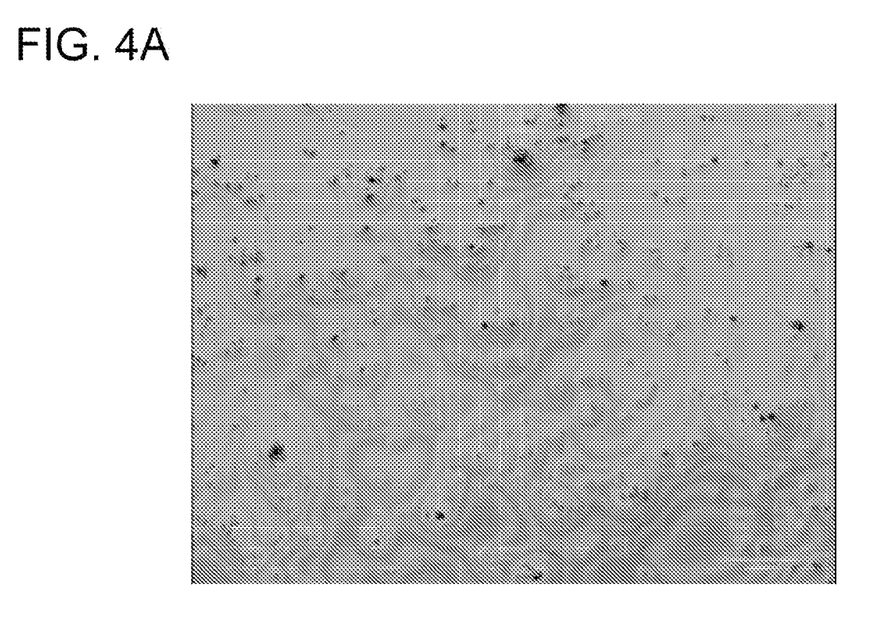
FIGS. 4A and 4B are surface photographs of an antiglare film of Example 1.
Figure 4B:
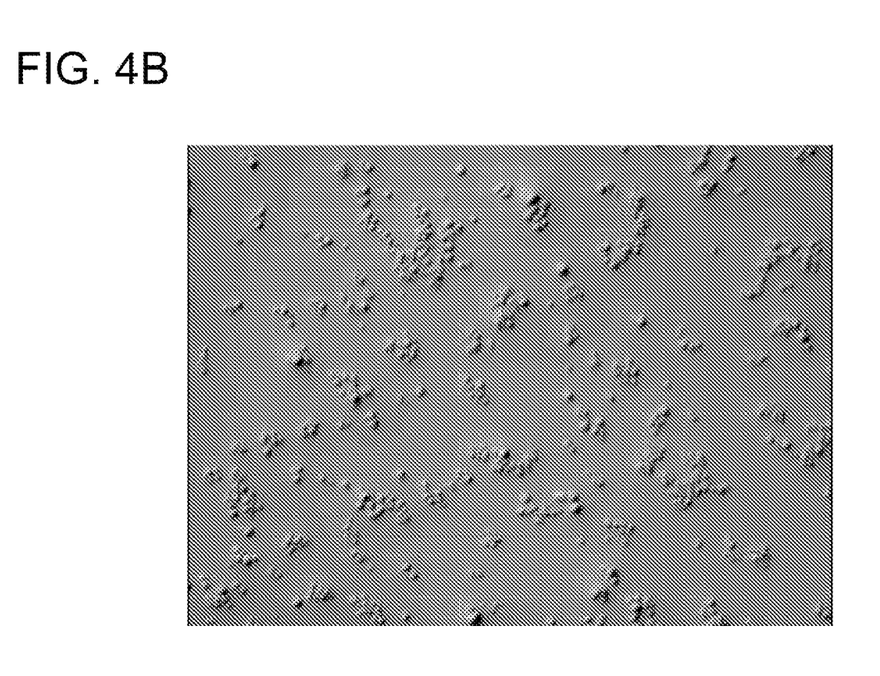
Figure 5A:
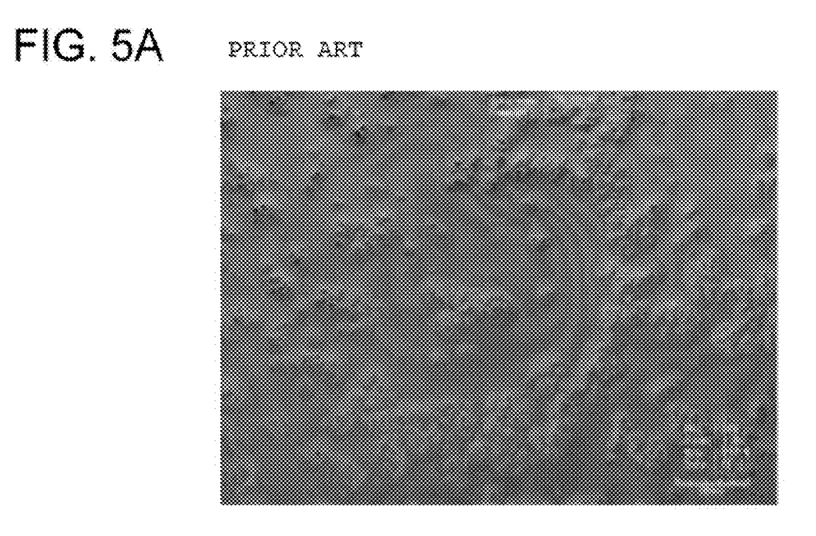
FIGS. 5A and 5B are surface photographs of an antiglare film of Comparative example 1.
Figure 5B:
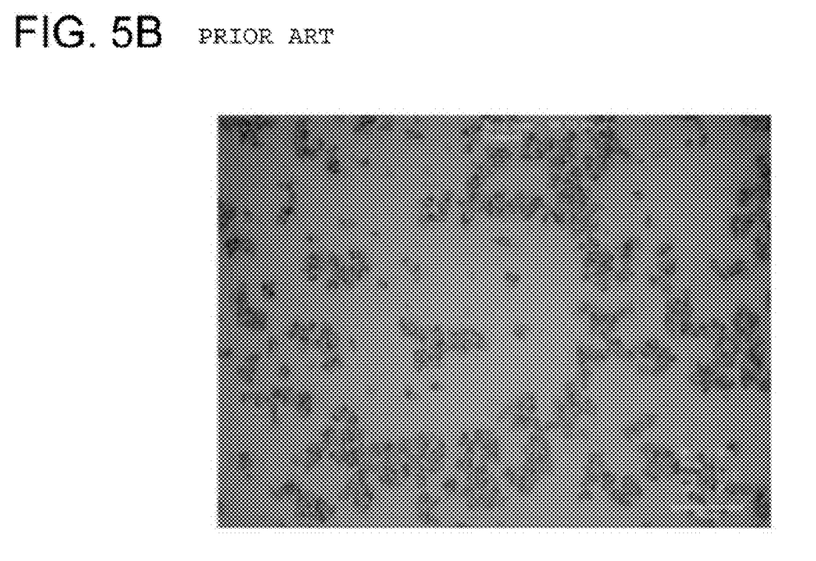
Figure 6A:
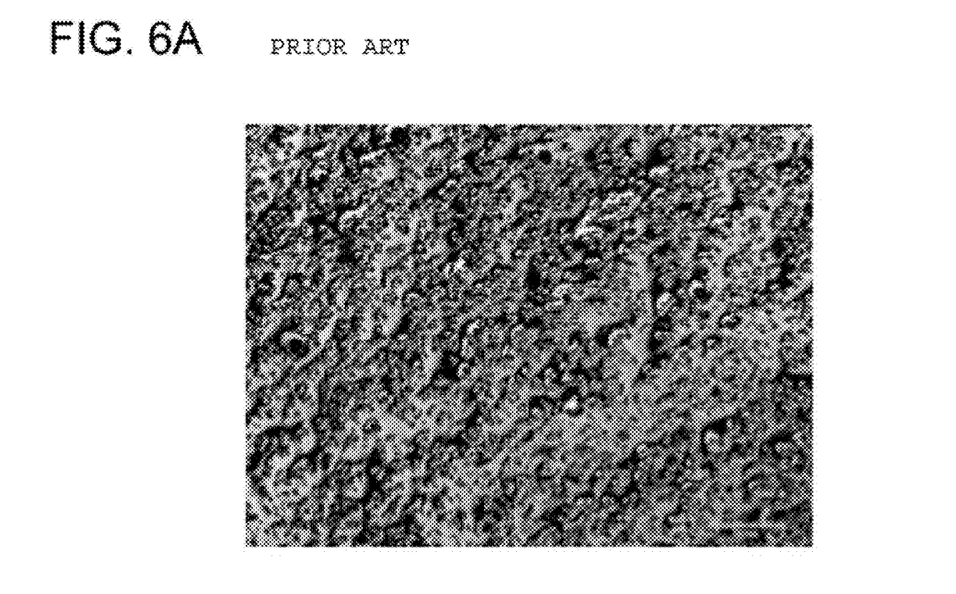
FIGS. 6A and 6B are surface photographs of an antiglare film of Comparative example 2.
Figure 6B:
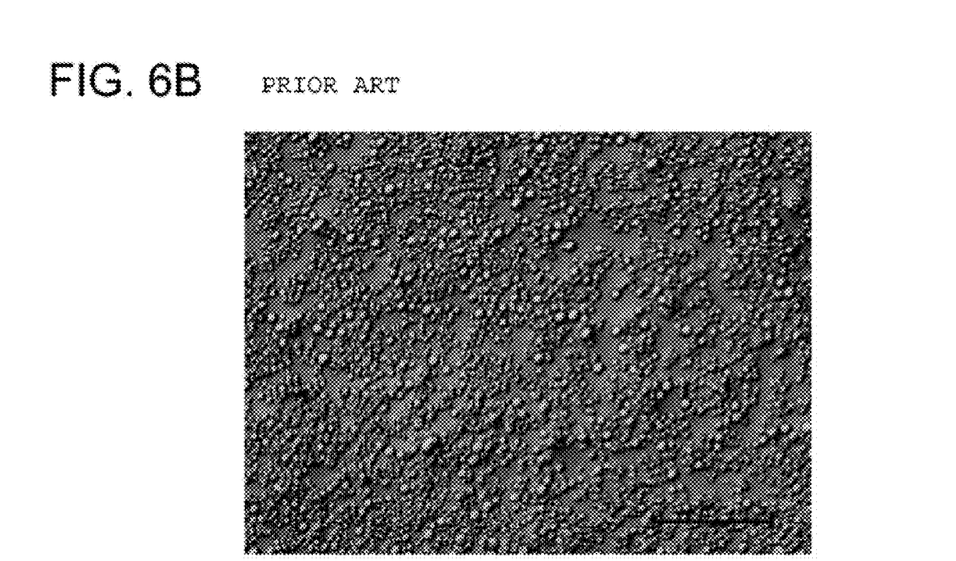

Two-dimensional aggregation: almost all fine particles are aggregated in in-plane directions of the antiglare layer Three-dimensional aggregation: fine particles are aggregated in in-plane directions and a thickness direction of the antiglare layer All over surface: fine particles are distributed all over the antiglare layer surface with almost no gap FIG. 4A to FIG. 6B show surface photographs of antiglare films of Example 1 and Comparative examples 1 and 2 as representatives of Examples 1 to 8 and Comparative examples 1 to 3. FIG. 4A, FIG. 5A, and FIG. 6A are surface photographs (reflection images) of antiglare films of Example 1, Comparative example 1, and Comparative example 2, respectively, taken with a laser microscope. FIG. 4B, FIG. 5B, and FIG. 6B are surface photographs (transmission images) of antiglare films of Example 1, Comparative example 1, and Comparative example 2, respectively, taken with an optical microscope.

TABLE 1

| | | | Paint | | | | | |
| | | | | Fine particles | | | | |
| | Resin | Solvent | Composition | Amount of addition (percent by weight) | Particle diameter (μm) | Magnitude of surface energy | Thickness of antiglare layer (μm) | Low-refractive-index layer |
|---|---|---|---|---|---|---|---|---|
| Example 1 | tetrafunctional UV oligomer | t-BuOH | styrene | 6 | 6 | solvent < fine particles | 11 | none |
| Example 2 | tetrafunctional UV oligomer | t-BuOH | styrene | 7 | 6 | solvent < fine particles | 12 | none |
| Example 3 | tetrafunctional UV oligomer | t-BuOH | styrene | 15 | 6 | solvent < fine particles | 12 | none |
| Example 4 | tetrafunctional UV oligomer | t-BuOH | styrene | 3 | 6 | solvent < fine particles | 9.5 | none |
| Example 5 | tetrafunctional UV oligomer | t-BuOH | styrene | 6 | 6 | solvent < fine particles | 11 | yes |
| Example 6 | tetrafunctional UV oligomer | TOL | MS filler | 5 | 10 | solvent < fine particles | 20 | none |
| Example 7 | tetrafunctional UV oligomer | MIBK + butyl acetate | silica | 3 | 0.01 | solvent < fine particles | 3 | none |
| Example 8 | tetrafunctional UV oligomer | t-BuOH | styrene | 6 | 6 | solvent < fine particles | 11 | yes |
| Comparative example 1 | tetrafunctional UV oligomer | toluene | styrene | 10 | 6 | solvent > fine particles | 12 | none |

TABLE 1-continued

| | Paint | | | | | | | |
|---|---|---|---|---|---|---|---|---|
| | | | Fine particles | | | | | |
| | Resin | Solvent | Composition | Amount of addition (percent by weight) | Particle diameter (μm) | Magnitude of surface energy | Thickness of antiglare layer (μm) | Low-refractive-index layer |
| Comparative example 2 | tetrafunctional UV oligomer | t-BuOH | styrene | 20 | 6 | solvent < fine particles | 12 | none |
| Comparative example 3 | tetrafunctional UV oligomer | TOL | MS filler | 5 | 12 | solvent < fine particles | 17 | none |

TABLE 2

| | Evaluation | | | | | |
|---|---|---|---|---|---|---|
| g | Degree of antiglare property | White turbidity | Total haze (%) | Surface haze (%) | Ra (μm) | State of particles |
| Example 1 | B | 1.0 | 15.0 | 1.0 | 0.16 | two-dimensional aggregation |
| Example 2 | B | 2.0 | 28.1 | 2.1 | 0.36 | two-dimensional aggregation |
| Example 3 | B | 1.7 | 40.0 | 4.4 | 0.28 | two-dimensional aggregation |
| Example 4 | B | 1.4 | 15.0 | 0.2 | 0.30 | two-dimensional aggregation |
| Example 5 | B | 0.5 | 15.0 | 0.0 | 0.05 | two-dimensional aggregation |
| Example 6 | B | 1.8 | 3.0 | 0.0 | 0.50 | two-dimensional aggregation |
| Example 7 | B | 0.9 | 15.0 | 0.0 | 0.10 | two-dimensional aggregation |
| Example 8 | B | 0.5 | 14.5 | 0.6 | 0.13 | two-dimensional aggregation |
| Comparative example 1 | A | 4.2 | 54.0 | 8.8 | 0.55 | three-dimensional aggregation |
| Comparative example 2 | A | 2.6 | 63.5 | 10.4 | 0.42 | all over surface |
| Comparative example 3 | B | 2.2 | 18.0 | 6.0 | 0.60 | three-dimensional aggregation |

The following is clear from Table 2.

Regarding the antiglare films of Examples 1 to 8, almost all fine particles are aggregated in in-plane directions through convection generated during drying of the solvent and, thereby, two-dimensional aggregates can be formed. Consequently, the arithmetic average roughness Ra becomes 0.05 to 0.50 μm and gradual unevenness can be formed on the antiglare layer surface. Therefore, the degree of antiglare property is at a good level of "B" and, in addition, the white turbidity is within a good range of 0.5 to 2.0. Therefore, the antiglare property and the reduction in the feeling of white turbidity are mutually compatible. Furthermore, the surface haze is 0% to 5% and the total haze of the film is 3% to 40%, so that both hazes are within good ranges.

On the other hand, regarding the antiglare film of Comparative example 1, since the surface energy of the solvent is larger than the surface energy of the fine particles, large aggregates (three-dimensional aggregates) of fine particles are formed because of convection generated during drying of the solvent. Consequently, the arithmetic average roughness Ra becomes 0.55 μm, so that the surface comes into a roughened state. Therefore, the degree of antiglare property is at a good level of "A", but the white turbidity becomes a large value of 4.2. Furthermore, the total haze and the surface haze become large values of 54.0% and 8.8%, respectively.

Regarding the antiglare film of Comparative example 2, since the amount of addition of filler exceeds 15 percent by weight in terms of a ratio relative to the resin, the fine particles do not diffuse, but distribute all over the antiglare layer surface with almost no gap. Consequently, the arithmetic average roughness Ra becomes 0.42 μm, so that the surface comes into a roughened state. Therefore, the degree of antiglare property is at a good level of "A", but the white turbidity becomes a large value of 2.6. Furthermore, the total haze and the surface haze become large values of 63.5% and 10.4%, respectively.

Regarding the antiglare film of Comparative example 3, since the average particle diameter of the fine particles exceeds 10 μm, the film thickness before drying is large, Benard cells become large, the fine particles form aggregates having three-dimensional spatial structures, and protrusions formed by these aggregates become steep. Consequently, the arithmetic average roughness Ra becomes 0.60 μm so that the surface comes into a roughened state. Therefore, the degree of antiglare property is at a good level of "B", but the white turbidity becomes a large value of 2.2. Furthermore, the total haze and the surface haze become large values of 18.0% and 6.0%, respectively. Moreover, the antiglare film of Comparative example 3 exhibits the feeling of glare.

In Examples 1 to 8, since the fine particles are aggregated two-dimensionally, an excellent antiglare property can be obtained and, in addition, the white turbidity can be reduced to 2.0 or less. On the other hand, in Comparative examples 1 to 3, since the fine particles are aggregated three-dimensionally, an excellent antiglare property can be obtained, but the white turbidity exceeds 2.0. That is, the antiglare property and a reduction in the feeling of white turbidity can be made mutually compatible by aggregating the fine particles two-dimensionally.

Up to this point, the embodiments and the examples according to the present application have been specifically described. However, the present application is not limited to the above-described embodiments and examples. Various modifications can be conducted on the basis of the technical concept.

For example, the values described in the above-described embodiments and examples are no more than exemplifications, and values different from them may be used as necessary.

In the above-described embodiments, examples in which the present application are applied to liquid crystal display devices are described. However, the present application is not limited to them. For example, the present application can be applied to, for example, various display devices, e.g., a plasma display panel, an organic EL display, an inorganic EL display, a CRT display, a rear projection display, a surface conduction type electron emission element display, a field emission display (FED), an LED display, and a rear projection display by using laser as a light source (laser TV), and touch panels.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An antiglare film comprising:
   a base material; and
   an antiglare layer which is disposed on at least one surface of the base material and which contains fine particles and a resin,
   wherein the fine particles constitute aggregates mainly in in-plane directions, and
   wherein gradual unevenness is disposed on the surface of the antiglare layer through aggregation of the fine particles, and
   wherein a haze of the film surface is 0% or more, and 5% or less, and a haze of the entire film is 3% or more, and 40% or less.

2. The antiglare film according to claim 1, wherein a white turbidity is 2.0 or less.

3. The antiglare film according to claim 1, wherein the gradual unevenness is formed through convection generated during drying of a paint which contains a resin, fine particles, and a solvent and which is applied to the base material and aggregation of the fine particles generated during formation of Benard cells.

4. The antiglare film according to claim 3, wherein a surface tension of the solvent contained in the paint is smaller than a surface energy of the fine particles.

5. The antiglare film according to claim 1, wherein a thickness of the antiglare layer is 3 μM or more, and 20 μm or less.

6. The antiglare film according to claim 1, wherein an arithmetic average roughness (Ra) of the antiglare layer surface is 0.05 μm or more, and 0.5 μm or less.

7. The antiglare film according to claim 1, wherein the fine particles contained in the antiglare layer comprises at least one of organic fine particles and inorganic fine particles.

8. The antiglare film according to claim 1, wherein a content of the fine particles in the antiglare layer is 3 percent by weight or more, and 15 percent by weight or less in terms of ratio relative to the resin.

9. The antiglare film according to claim 1, wherein the average particle diameter of the fine particles is 0.01 μm or more, and 10 μm or less.

10. The antiglare film according to claim 1, wherein the fine particles are covered with the resin.

11. The antiglare film according to claim 1, further comprising a low-refractive-index layer having a refractive index lower than that of the antiglare layer on the antiglare layer.

12. A polarizer comprising the antiglare film according to any one of claims 1 or 2 to 11.

13. A display device comprising the antiglare film according to any one of claims 1 or 2 to 11 on a display surface.

14. A method for manufacturing an antiglare film comprising:
   applying a paint containing a resin, fine particles, and a solvent to a base material;
   drying the paint to aggregate the fine particles mainly in in-plane directions so as to form gradual unevenness on the surface of the paint; and
   curing the paint provided with the gradual unevenness.

15. The method for manufacturing an antiglare film according to claim 14, wherein the gradual unevenness is formed through convection generated during drying of the paint and aggregation of the fine particles generated during formation of Benard cells in the forming gradual unevenness.

16. The method for manufacturing an antiglare film according to claim 14, wherein the surface tension of the solvent contained in the paint is smaller than the surface energy of the fine particles.

* * * * *